United States Patent [19]

Eymard

[11] 4,265,418
[45] May 5, 1981

[54] ELONGATED INFLATABLE STRUCTURES FOR FLYING DEVICE BODIES

[75] Inventor: Michel Eymard, Toulouse, France

[73] Assignee: ZODIAC, Saint Cloud, France

[21] Appl. No.: 37,920

[22] Filed: May 9, 1979

[30] Foreign Application Priority Data

May 11, 1978 [FR] France ................. 78 14093

[51] Int. Cl.³ ................. B64B 1/58; B64B 1/02
[52] U.S. Cl. ................. 244/125; 244/31
[58] Field of Search ............ 244/30, 33, 125, 126, 244/127, 128, 31

[56] References Cited

U.S. PATENT DOCUMENTS

| | | | |
|---|---|---|---|
| 1,372,924 | 3/1921 | Andersson | 244/127 |
| 1,496,416 | 6/1924 | Honeywell | 244/30 |
| 1,648,630 | 11/1927 | Upson | 244/125 |
| 1,988,328 | 1/1935 | Noelle | 244/125 |
| 2,068,870 | 1/1937 | Respess | 244/126 |

*Primary Examiner*—Charles E. Frankfort

[57] ABSTRACT

An inflatable envelope surrounding a compression beam, at least one flexible traction beam associated with the compression beam and surrounding envelope. The traction and compression beams are coplanar and at least one flexible diagonal mechanical network is interposed between the beams integral therewith. The envelope, the compression and traction beams and the diagonal network are connected together so that the inflation of the envelope maintains the assembly of these elements in shape.

9 Claims, 5 Drawing Figures

ELONGATED INFLATABLE STRUCTURES FOR FLYING DEVICE BODIES

The present invention relates to an elongated inflatable structure forming the body of a flying device, such as a balloon or airship, comprises an inflatable envelope surrounding an axial compression means, several traction means and several flexible mechanical coupling means interposed respectively between the compression means and the traction means.

An inflatable structure forming a balloon body of the above kind is already known. However, the relative arrangement of the different component parts confers on the structure, once it is inflated, a rigidity such that stresses, applied locally, even momentarily (for example the action of the wind, overloading, impact), may cause damage to the body requiring repair and causing it to be withdrawn from service. The result is a loss of time and money.

Furthermore, the arrangement of this known inflatable structure does not allow easy handling of the non-mounted component parts, and in particular does not allow the transport of these component parts by conventional means such as conventional motor vehicles.

The invention has as its aim to palliate these disadvantages by providing an inflatable structure capable of withstanding momentary local stresses without destruction and a structure formed from component parts capable, particularly insofar as their bulkiness and weight are concerned, of being transported by motor vehicle, for example to bring the inflatable structure in separate parts to the take-off place of the flying device.

With these considerations in view, the inflatable structure of the invention is characterized in that the envelope surrounds a central compression means which is a beam formed from sections joined end to end to each other, that the traction means are formed by flexible traction beams distributed around the inflatable envelope and that the mechanical coupling means are formed by diagonal mechanical networks OT the inflatable envelope, the compression beam, the traction beams and the diagonal mechanical networks are connected together so that the inflation of said envelope maintains the whole of these elements in shape.

Because the central beam is formed from separate sections joined end to end, it can be easily transported in dismantled form. Moreover, the diagonal mechanical networks ensure a better distribution of the stresses between the different beams, thus ensuring a better behaviour of the body during use.

In such a structure, the traction beams may be formed by flexible links, such as cables, or they may even be formed from rigid elements hinged to one another in the same way as the compression beam.

To permit optimum transmission of the stresses between the compression beam and the traction beam, it is desirable that the diagonal mechanical network be inclined at 45° in relation to the longitudinal direction of the inflatable structure.

To obtain even transmission and uniform distribution of these stresses over the entire length of the compression beam, it is advantageous for the diagonal mechanical network to be formed from a woven cloth whose warp and weft threads form the diagonals of said network.

It is moreover provided that the elements of the compression beam be connected by means of swivel joints and/or that the compression beam cooperates by contact (friction or bonding) with a closed or open sheath integral with the diagonal mechanical network. Where the contact is formed with friction, it is preferable that the sheath can be made to only slide over said beam when the stresses to which it is subjected longitudinally become greater than a predetermined value.

It is advantageous for the traction beams also to be housed in sheaths integral with the diagonal mechanical network.

Therefore, when the inflated structure is subjected to local momentary stresses, it is capable of bending, then reassuming resiliently its normal form, which avoids any need for repair.

It will also be noted that, because of the construction of the compression beam, and possibly of the traction beams, in the form of separate sections joined end to end, maintenance is simplified for, in the case of an accident, only the damaged section(s) needs to be repaired or replaced, and the cost thereof is correspondingly reduced.

The invention will be better understood from the following description of two of its embodiments, given purely by way of a non-limiting illustration. In this description, reference is made to the accompanying drawings in which.

Figure 1:
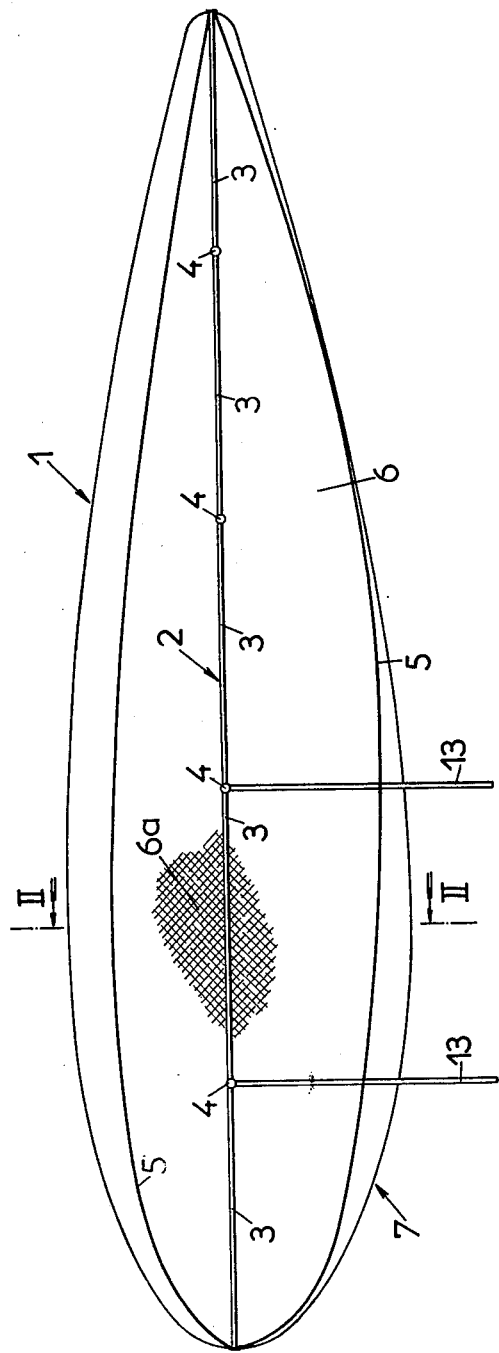
FIG. 1 shows, in axial section, along line I—I of FIG. 2, an inflatable structure in accordance with the invention and forming the body of a lighter than air flying device, such as an airship or a captive balloon.
Figure 2:
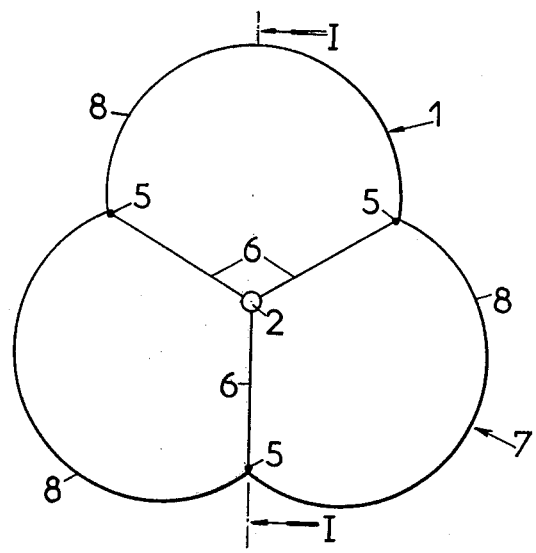
FIG. 2 is a cross-sectional view along line II—II of the body of FIG. 1.

In FIGS. 1 and 2, the embodiment of the inflatable structure of the invention corresponds to a body 1 for a lighter than air flying device, such as a captive balloon or an airship.

Figure 4:
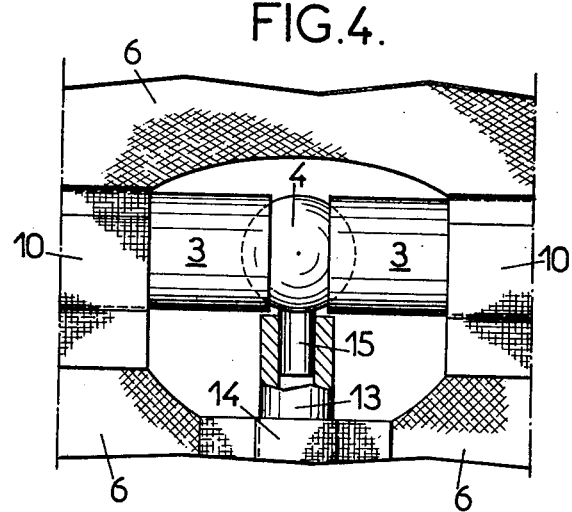

Body 1 comprises a central compression beam 2 formed from a plurality of rigid elements 3 placed end to end and connected by articulations 4 allowing them possibly to slant in relation to each other under circumstances which will be mentioned further on. As shown in FIG. 4, elements 3 are formed by tubular sections and articulations 4 are ball-and-socket joints on which bear the ends of the tubes.

Means, which will be mentioned further on, are provided for ensuring the cohesion of the assembly.

It will however be noted that in normal conditions the rigid elements 3 are maintained aligned and form a substantially rectilinear beam.

Cables 5, forming traction beams, are fixed by their ends to the respective ends of compression beam 2 and are held away from said beam and maintained under tension by tensioning means which will be explained further on. These cables 5 and compression beam 2 are coplanar and the planes thus defined form therebetween equal angles. Moreover, the cables, three in number in the example shown in FIGS. 1 and 2, are of equal length. For this reason, the central compression beam 2 forms a longitudinal axis of symmetry of body 1.

However, these arrangements are not imperative and may be adapted depending on the application in view.

Cables 5 are made from steel or any other material undergoing only a very small extension when it is tensioned, but cables 5 may be replaced, if need be, by rigid elements articulated to each other and capable of bending in a similar manner.

Each cable 5 is connected to compression beam 2 by a flexible diagonal mechanical network 6 tensioned and interlocked with cables 5 and beam 2, this network 6 being intended to ensure the transmission of stresses between the cables and the beam.

Although this network may be formed from separate elements such as cables or crossed straps, it is however advantageous, in order to obtain a continuous distribution of the stresses along the beam, for this network to be formed from a woven cloth, forming a web 6 interposed between cable 5 and beam 2, this web forming the plane determined by the cable and the beam. In this case, it is the warp threads and the weft threads which form the above mentioned diagonal network and these threads are sloped at 45° in relation to beam 2, as shown by reference number 6a in FIG. 1.

Figure 3:
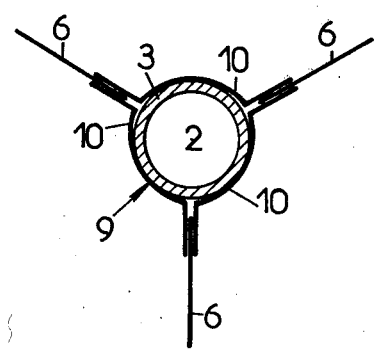
FIGS. 3 to 5 show in section constructional details of the body of FIGS. 1 and 2.

Finally, body 1 also comprises an inflatable gas-tight envelope 7 which forms, once inflated under pressure, the previously mentioned tensioning means and serving to tension cables 5 and to stretch the webs 6 between cables 5 and beam 2. The envelope 7 surrounds the different components which have just been described and is integral with webs 6. Envelope 7 may present, in cross section, any appropriate shape and, in particular, as shown in FIG. 3, to form three lobes 8 joining together the webs 6.

So that this structure may be subjected to stresses, each web 6 is fixed to beam 2 and, for this, collars may be provided spaced around beam 2. But, to ensure that the transmission of stresses between beam 2 and webs 6 is continuous, it is preferable to provide a sheath 9 gripping beam 2 by friction, a sheath on which are fixed (for example bonded or sewn) webs 6. According to the example shown in FIG. 3, sheath 9 is obtained from strips 10 of the same material as webs 6, stretched against elements 3 of beam 2, and whose longitudinal edges are bonded to the longitudinal edges of webs 6. This sheath may run without a break from one end to the other of beam 3, but breaks can also be provided at certain articulations 4, as shown in FIG. 4, for a purpose which will be indicated later on.

Because sheath 9 grips beam 2 by friction, the component parts 3 of this latter are maintained end to end and cannot move axially away from each other.

However, the friction exerted by the sheath on elements 3 has a value such that, when excessive stresses are applied to the body, sheath 9 may slide over elements 3.

Similarly, each cable 5 is housed in a sheath 11 running over the whole length of the body but, contrary to sheath 9 which grips beam 2 by friction, sheath 11 exerts no strain on cable 5, which may therefore slide in sheath 11.

Figure 5:
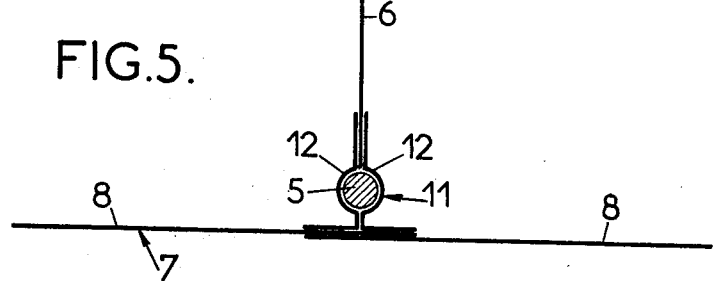

As shown by way of example in FIG. 5, sheath 11 is defined by two pieces 12, of the same material as web 6 and/or envelope 7, these two pieces 12 being bonded or sewn by their longitudinal edges, on the one hand, to the corresponding edge of web 6 and, on the other hand, to envelope 7. In this connection, it may be provided for envelope 7 to be formed from an assembly of several pieces (for example three for the body shown in FIGS. 1 and 2) each forming one of lobes 8, the pieces forming two neighbouring lobes being connected along the assembly of pieces 12.

According to this embodiment, cable 5 extends over the whole length of body 1 substantially along the connection of web 6 to envelope 7.

However, this arrangement is not obligatory and cable 5 may be disposed, nearer traction beam 2, by being carried by web 6.

In the case where the body which has just been described is intended to support a nacelle or any other load, this latter is fixed to the body by means of two slings 13, formed for example by rigid tubes.

It is important to note that these tubes 13 are not connected mechanically to elements 3 of the compression beam 2, but that they are firmly secured to only one of webs 6. This securing is obtained, as well as for elements 3, by means of a strip 14, of the same material as web 6, bonded thereto and gripping tube 13 by friction.

Each tube 13 extends opposite to and as far as the region of a ball-and-socket joint 4, which is provided with a projecting finger 15 penetrating into the end of tube 13, by means of which each tube is positioned in relation to beam 2 without any rigid connection affecting the deformability of the whole of the inflatable structure. In this case, it is preferable for sheath 9 surrounding beam 2 to be interrupted at ball-and-socket joint 4.

The inflatable structure in accordance with the invention presents numerous advantages.

Because of the envisaged combination of elements and the arrangement thereof, the overall stresses which this structure may withstand and its apparent stiffness are identical to those of rigid elements, without it being necessary for the envelope to be inflated at high pressures. For this reason, for a given mechanical resistance, the inflatable structure of the invention is much lighter than equivalent structures used up to present.

Moreover, if the admissible stresses are exceeded, the compression beam folds at the articulations of the rigid elements without breakage and thus are kept the advantages of conventional flexible structures.

Moreover, the presense of flexible diagonal mechanical networks allows a possibly high local tension to be distributed over a large portion of the rigid elements, so that the stress-be unit area remains low.

Finally, because the beams are formed from elements joined end to end which may be of shorth length or from flexible links, the inflatable structure of the invention only occupies, when it is dismantled, a small volume facilitating its storage and transport.

It will also be noted that because of the simplicity of the component parts used and the simplicity of their assembly, unqualified personnel may be used for mounting such structures.

I claim:

1. An elongated inflatable structure forming the body of a flying device such as a balloon or airship, comprising: an inflatable flexible envelope; a central axial compression means surrounded by said inflatable envelope; a plurality of uniformly spaced traction means; connected to said envelope: and a plurality of flexible mechanical coupling means interposed between each of the compression means and each of the traction means, said compression means comprises a beam formed from a plurality of rigid sections arranged end to end and articulatingly connected, each of said traction means comprising a beam, and said mechanical coupling means comprising diagonal mechanical networks, said inflatable envelope, compression beam, traction beams and diagonal mechanical networks being connected together so that the inflation of said envelope maintains all of these elements in shape.

2. The inflatable structure as claimed in claim 1, wherein the traction means comprises a flexible cable.

3. The inflatable structure as claimed in claim 1, wherein the traction means comprises a plurality of rigid sections articulatingly connected to each other.

4. The inflatable structure as claimed in any one of claims 1 to 3, wherein the diagonal mechanical network is inclined at 45° in relation to the longitudinal direction of the inflatable structure.

5. The inflatable structure as claimed in claim 4, wherein the diagonal mechanism network comprises a woven cloth having warp and weft threads forming the diagonals.

6. The inflatable structure as claimed in claim 1, wherein sections of the compression beam are connected by ball-and-socket joints.

7. The inflatable structure as claimed in claim 1, wherein the mechanical networks are connected to the compression beam by a sheath surrounding said beam and integrally formed with the diagonal mechanical network.

8. The inflatable structure as claimed in claim 1, wherein the traction beam is housed in a sheath integral with the diagonal mechanical network.

9. The inflatable structure as claimed in claim 1, including sling means integral with at least one diagonal mechanical network to connect a load to the body.

* * * * *